United States Patent [19]

Kohaut

[11] Patent Number: 4,458,460

[45] Date of Patent: Jul. 10, 1984

[54] CABLE MODULE DEVICE

[75] Inventor: John E. Kohaut, West Orange, N.J.

[73] Assignee: Raceway Components, Inc., Nutley, N.J.

[21] Appl. No.: 266,701

[22] Filed: May 26, 1981

[51] Int. Cl.³ .................. E04C 3/10; H02G 3/08; E04F 17/08

[52] U.S. Cl. .......................... 52/221; 52/1; 52/232; 174/48

[58] Field of Search .............. 52/1, 221, 220, 232, 52/317; 174/48, 151; 138/92

[56] References Cited

U.S. PATENT DOCUMENTS

| | | | |
|---|---|---|---|
| 3,087,053 | 4/1963 | Jones | 220/3.4 X |
| 3,864,883 | 2/1975 | McMarlin | 52/232 X |
| 3,995,102 | 11/1976 | Kohaut | 174/48 |
| 4,093,818 | 6/1978 | Thwaites et al. | 52/232 X |
| 4,136,707 | 1/1979 | Gaillot et al. | 52/232 X |
| 4,232,493 | 11/1980 | Gray et al. | 52/232 X |
| 4,249,353 | 2/1981 | Berry | 52/232 |
| 4,270,318 | 6/1981 | Carroll et al. | 52/221 X |
| 4,272,643 | 6/1981 | Carroll et al. | 52/232 |
| 4,304,079 | 12/1981 | Thorsten | 52/232 X |
| 4,324,078 | 4/1982 | Gray | 52/221 |

FOREIGN PATENT DOCUMENTS

| | | | |
|---|---|---|---|
| 2154841 | 5/1973 | Fed. Rep. of Germany | 52/232 |
| 2536565 | 2/1977 | Fed. Rep. of Germany | 52/232 |

Primary Examiner—J. Karl Bell

[57] ABSTRACT

A cable module device wherein a grommet plate closes the upper end of the module and, in the absence of high heat, seals and protects the module where, for example, a fire, located away from the module, results in cold smoke and water moving onto the module as from a sprinkler, fire hose, broken pipes, etc. on floor above or same floor as the module. The module is further provided with normally inert heat-sensitive plates which when triggered by a flame expand, to form a barrier in the module against passage therethrough of such excessive heat and flames.

7 Claims, 5 Drawing Figures

CABLE MODULE DEVICE

OBJECTS OF THE INVENTION

This invention relates to cable passage devices, for use, for example, for passage of multi-wires and cables, from a source, through openings in building structures such as in walls and in concrete and other floors, for connection with and disconnection of telephone, power, and other electrical devices. Devices proposed heretofore for such purposes have proven objectionable in that, in case of fire, such devices frequently formed raceways facilitating the passage of smoke, heat, and flame and water therethrough, and were further objectionable in failing to meet the requirements of Underwriters Laboratories and local building requirements. Such requirements becoming more rigid in view of the tragic consequences ensuing from the use of cable passage devices which act as conduits facilitating the flow of heat and fire, with ensuing injury to persons and damage to property.

The module of the invention overcomes objections such as those above recited in the devices of the prior art, by novel structural features incorporated therein and automatically forming a smoke, heat and water barrier, blocking passage thereof therethrough of cold smoke and water, as in the case of a fire occurring away from the module, and blocking passage therethrough of fire and smoke, by automatic expansion of heat-sensitive plates, expanding and closing and sealing the interior of the module. Further novel features of the module effectuate rapid transfer of heat through heat transfer and radiating members, dissipating such heat directly into selective ambient areas and areas of the mass of cement or other floor material. The invention further effectuates rapid and automatic dissipation of heat surges and maintains the cables passed or positioned therein within permissible Underwriter's Laboratories specified temperatures.

On continued passage of heat, as for example, in the case of a fire, the fire retarding means incorporated in the module, automatically expand and seal the cables in the module, which then forms essentially a fire wall, barring passage of fire, flame and water. The invention further includes heat radiating means provided on the exterior of the lower portion of the module, preferably on a different side or sides than the heat radiating means at the upper portion thereof, for maximum efficiency of absorption of heat into the floor mass.

BACKGROUND OF THE INVENTION

The module of the invention is a device adapted to be readily installed, for example, in the initial pouring of floors, as preformed modules, spaced as desired, to be subsequently activated, or to be positioned in openings formed, after pouring, in the floor or other structural member. The invention is adapted for passage of, for example, and without limitation thereto, telephone and other cables through the module, for connection with electrical and electronic instruments and other devices and apparatus. The cables may originate in raceways or carriers or other sources, and readily passed through the device for connection with accessory devices to be powered or otherwise served by the cables as desired. The invention incorporates novel means for compressing and sealing the cables therein on occurrence of elevated temperatures, as in the case of fire, automatically inhibiting passage of smoke, water and flames through the module, novel means automatically sealing the module and cables therein. Novel grommeting means provided at the top of the module exert a sealing, compressing effect on the cables with increase in temperature, squeezing the cables, creating a bubble effect and increased sealing action on elevation of temperaure.

Automatically operating fire retarding foaming means in the module, heat radiating means on the module, and grommet cable sealing means in the module cooperate to automatically absorb heat and prevent passage thereof and of flames, smoke and water through the module in sequences as occur in the case of a fire, originating in a flow below and in passage of water and smoke from a floor above. The device of the invention is adapted for passage of a single cable having one or a multiple of wires therein or a plurality of cables having multiple wires—for example, ten or of any other number of cables or multiples thereof.

DESCRIPTION OF THE DRAWINGS

The invention is, without limitation thereto, illustrated by way of example in the appended drawings, wherein similar reference characters indicate like parts and wherein.

PREFERRED EMBODIMENT OF THE INVENTION

Figure 4:
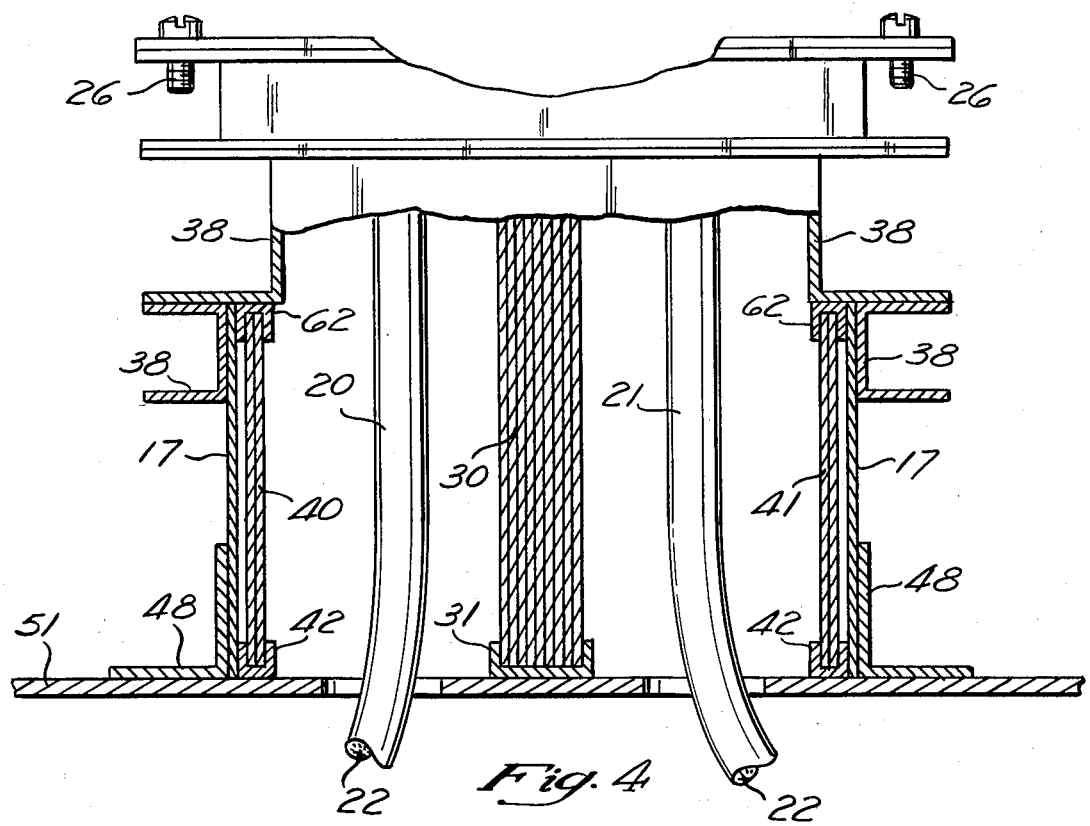
FIG. 4 is a partly fragmentary, medial, transverse sectional view, of the lower half (17) of the module, showing it positioned in a floor of a building structure opening, with cables passing therethrough, pursuant to the invention.
Figure 5:
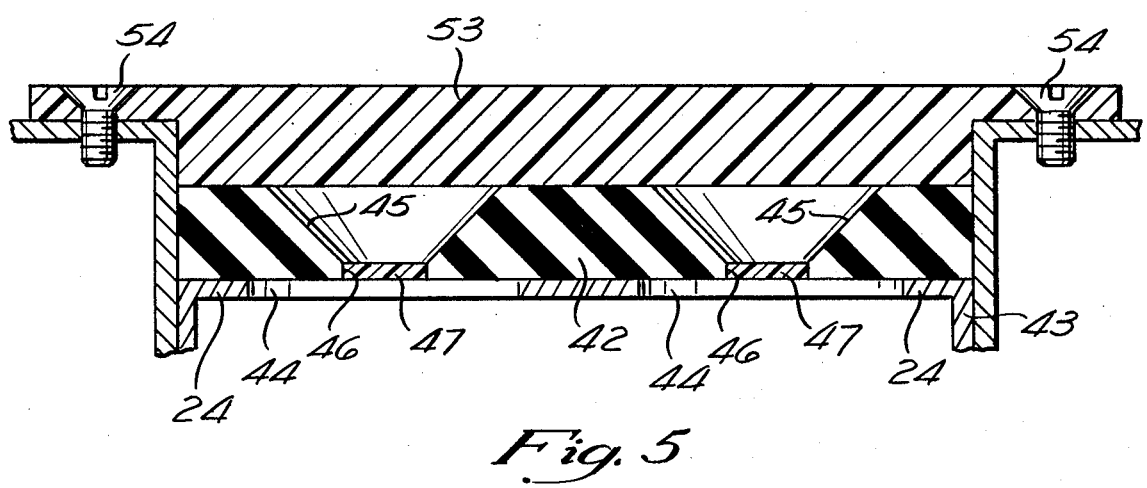
FIG. 5 is an enlarged, fragmentary, transverse, sectional view of the upper end of the module, taken at line 5—5 of FIG. 1.

This invention comprises a fire and water resistant cable conduit module 15, preferably made of open, hollow (FIG. 1) tubular metal, such as, and without limitation thereto, 16 gauge steel, having a wall member 16 which may be unitary or may be formed of sections, such as 17, 18 (FIG. 2) bolted, welded, or otherwise secured together in any desired or convenient manner, defining a hollow interior plenum or passageway 19 for passage of cables, such as shown at 20, 21 (FIG. 4) therethrough. Such cables may be formed for carrying one or more, for example, as shown at 22 (FIG. 4) a plurality of wires, for telephone, electronic and other wire and cable functions and may comprise multiples of pairs of aluminum sheathed or other communication wires of light gauge copper. The lower section 17 of the module 15 may be formed as a unit of standard length, and the upper section 18 of a length conforming to the specifications of the particular structural member, such as (FIG. 1) floor 25 wherein the module is to be positioned. Means may be provided for connecting the sections 17 and 18 (FIGS. 1, 2), such as by bolting or otherwise connecting them, as noted at 26, for example through means 27 (FIG. 1) heat insulating the sections from each other.

Figure 1:
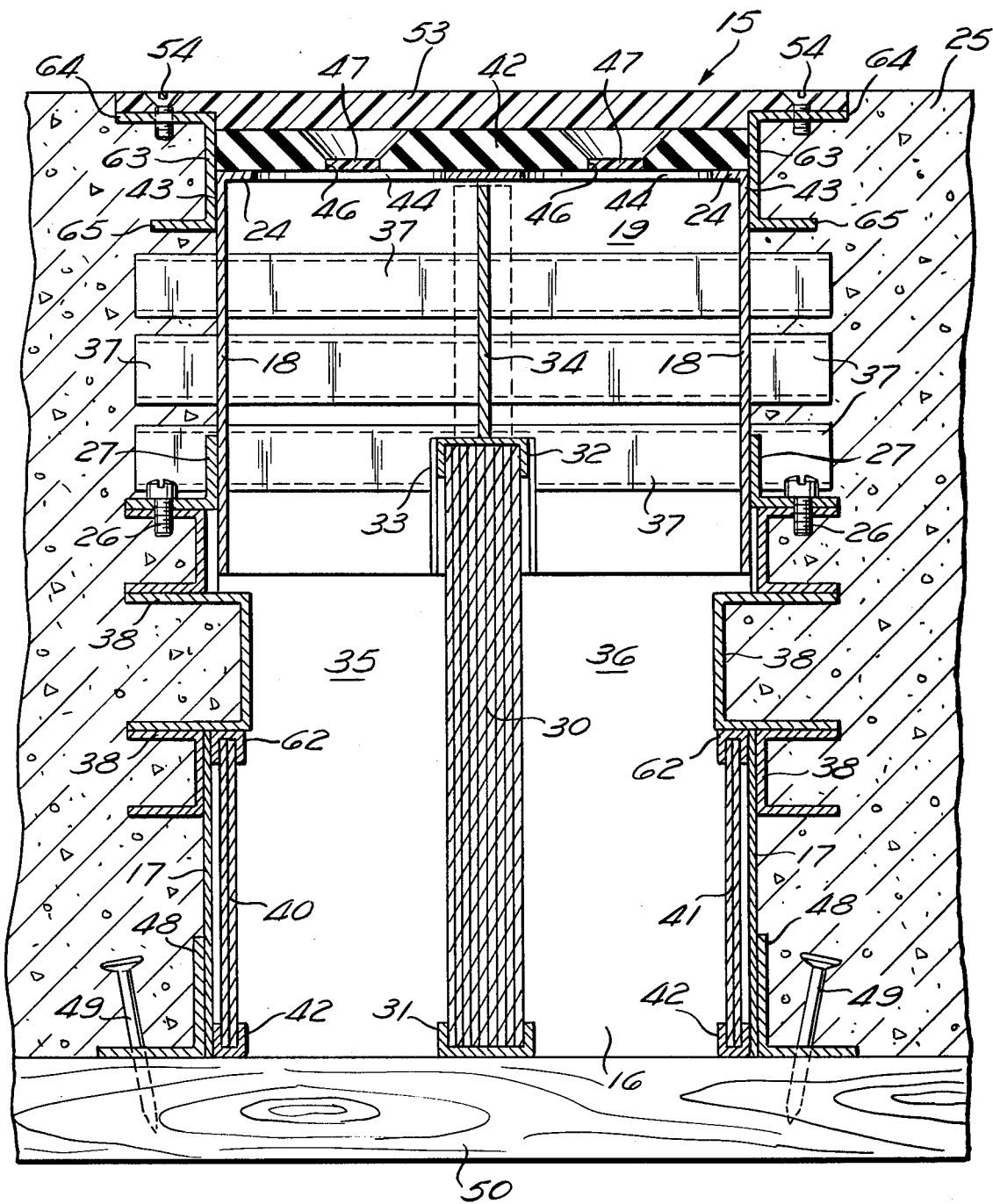
FIG. 1 is a transverse, vertical sectional view, of a module embodying the invention, shown positioned in a building structure opening, taken at line 1—1 of FIG. 2.
Figure 2:
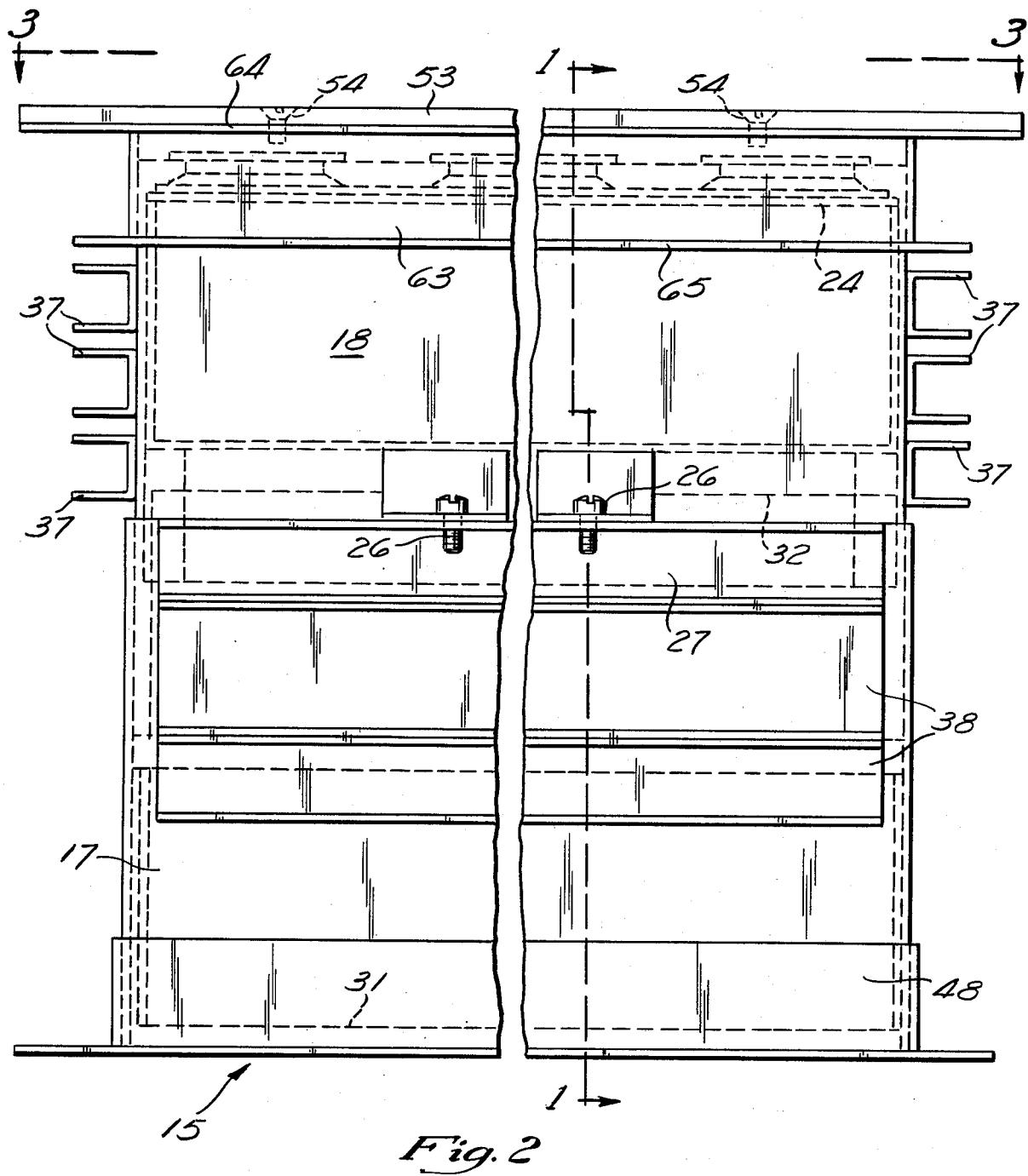
FIG. 2 is a side elevational, partly broken, view thereof, taken at line 2—2 of FIG. 3.

Excess heat generated in the cables is initially transferred, as through the outwardly directed upper section radiating fins 37, in exothermic fashion, into the floor mass 25, which may be cement or other material endothermically massively receptive to heat so radiated. A fin 64 at the uppermost end of the module may dissipate heat into ambient air, opening thereinto. Fin 64 may be the upper flange of channel member 63 (FIG. 1).

In the case of fire or highly elevated temperatures, rapid and continued generation of excess heat will activate means in the lower section of the module to expand and seal the module. Said means may (FIG. 1), for example, comprise one or more plates 30, preferably of a material which will automatically expand and foam under pressure on elevated temperatures; a material found highly suitable for that purpose is water glass, which foams and creates tremendous pressure on occurrence of fire or highly elevated temperatures, the foam flowing and sealing into all voids in the module and between the module and the structural opening, thus forming a fire wall or barrier effectively preventing passage of flame and excess temperatures therethrough. Water glass, noted as one example of materials suitable for the purpose, is organic hydrated sodium silicate. At about 212° C., the water-vapor escapes, to leave a solid, fine, porous, uncracked and thermally insulating layer of foamed material, having a density of 0.1 to 0.2 g/m$^3$. It is a compound of sodium, silicon, hydrogen and oxygen.

The upper and lower ends of plates 30 may be positioned in the module by any suitable means as, for example, lower and upper brackets or holders 31,32 of heat insulating material. One or both of the holding means 31,32 in turn may be positioned (FIG. 1) in a holding bracket 33 which may be made of heat conducting material if desired, such as steel, and which may be formed unitarily with or secured to the lower end of a bar 34, which may be of "Z" bar form, positioning the plates and their brackets 30 medially in the lower end of the device, and thereby dividing the lower portion of the module into separate cable passageways 35,36 therethrough.

Automatically expanding plates 40,41 of material similar to that of plates 30, may be secured (FIG. 1) to the inner wall of the lower section 17 of the module, as by suitable heat insulating bracket means 42,62. On occurrence of excess heat, the plates 40,41 and medial plates 30 which, at room temperature, are relatively inert and define passageways for the cables, expand and foam automatically on substantial increase in temperature, filling the module and forming essentially a fire wall within and across the module, pressing the cables therein and forming therewith a barrier against passage of heat, flames and smoke; in so doing plates 40,41 expand inwardly toward plates 30 which expand outwardly; the cables are thus firmly compressed and sealed intermediate the expanding plates.

As above noted, plates 30 normally (at room temperature) divide the module into passageways or compartments wherein different use-serving or kinds of wire or cables—for example, high and low voltage wires—may be respectively passed in separately shielded and isolated relation.

The "Z-bar" 34 enhances the heat dissipating characteristics of the device, being mounted interiorly of the module at the upper or plenum section 19 thereof; bar 34 engages the inner wall of the upper portion of the module in line with the fin means 37 disposed on opposite sides of the top portion of the module and also is in contact with the bracket 33 holding the plates 30 and separated therefrom by heat insulating bracket 32.

Figure 3:
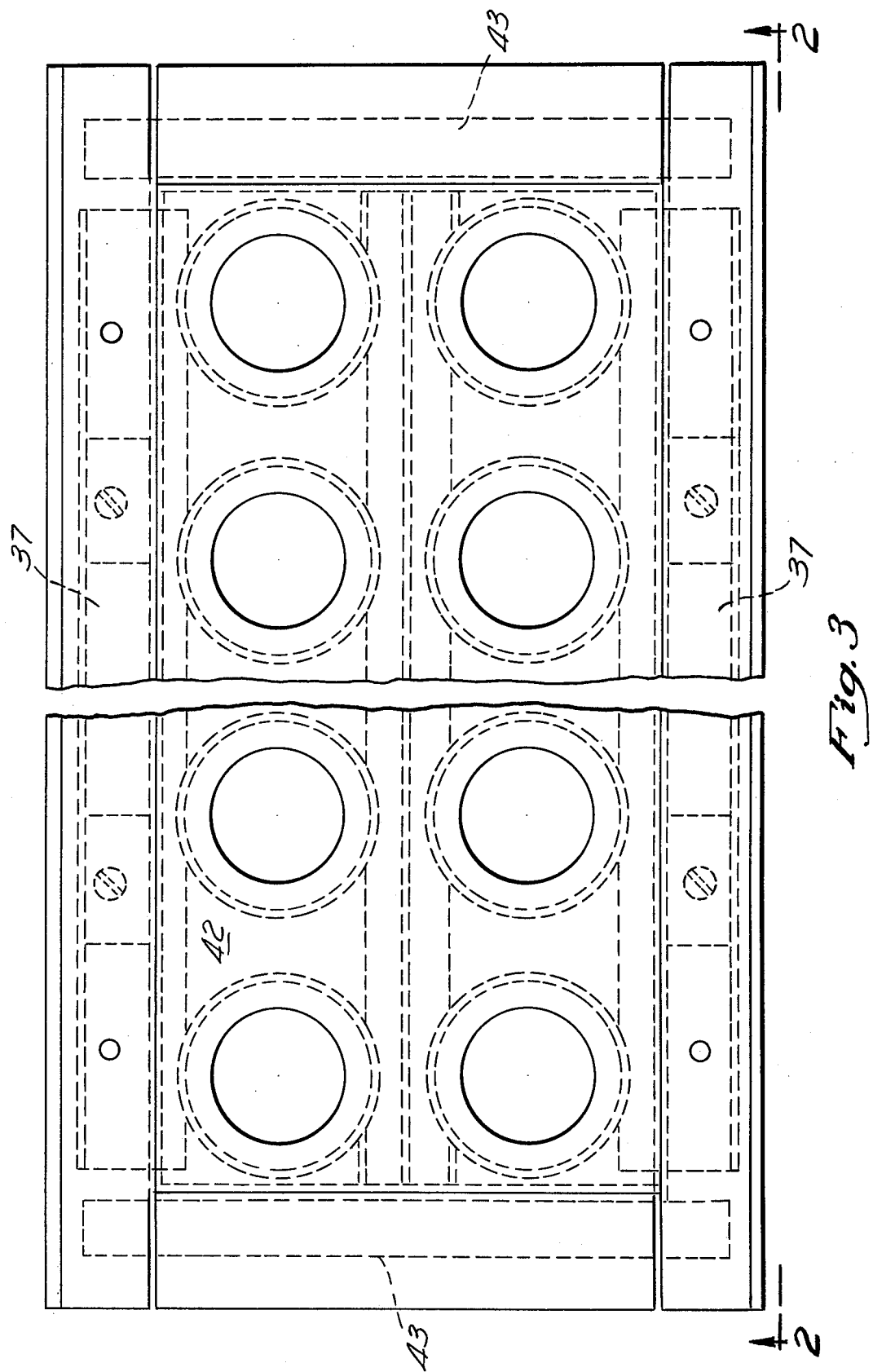
FIG. 3 is a partly fragmentary, top plan view thereof, taken at line 3—3 of FIG. 2.

The heat dissipating fin means 37 at the opposed sides (FIG. 2) of the upper portion of the module preferably comprise U-shaped channels defining fins extending (FIG. 1) into the (cement or other) floor mass 25 for immediate heat transference thereinto; the lower section 17 of the module may be provided with dissipating fins such as channel members 38 preferably (FIG. 1) secured to opposed sides of the outer wall of the module at right angle to and planar spaced relative to the channel members 37 on the upper portion of the module, thereby providing rapid heat transference in different directions from the upper and lower portions of the module. The module may be formed rectangularly, as shown in FIG. 3, or of other contour desired.

The module is (FIGS. 1, 3) further preferably provided with cable sealing grommet means 42 at the upper end thereof, positioned on a supporting plate or flange 24 which may be unitary with the wall of the upper portion 18 of the module or secured thereto and having cable passage openings 44 therein. The grommet 42 has cable receiving openings 46 therein, normally closed by suitable plastic or other discs 47; in use of the module, discs 47 would be removed to permit passage of cables through the grommet openings; the discs 47 could be replaced when desired, to close openings 46. The top metal frame 43 (FIG. 1) is a channel welded or otherwise secured around the four sides of the top of the module. Channel 63 has a top flange 64 exposed to the air, radiating heat into the air as well as some heat into the concrete through the bottom flange 65 of top channel 63. The grommet plate 42 may be made of silicone rubber or other material of equal tensile "memory" and other properties of non-flammable rubber material such as silicone or other material with memory; thus plate 42 squeezes and closes tightly onto cables (20, 21, FIG. 4) passed therethrough, tending to return to its original (smallest) opening, increasing the grommeting effect on the cables. Cables 20, 21 with increase in temperature (as in the case of a fire) creates a seal against entry of water and cold smoke.

In the absence of high heat the grommet plate 42 is sealed in place; plugs 47 pass in to seal the grommet plate. Cables passed through the grommet maintain the module sealed automatically, protecting against passage therethrough of cold smoke and water originating, for example, from a fire away from the device but which does not generate sufficient flames or heat to trigger the heat-sensitive expanding plates 30,40.

The grommet plate 42 is sealed in place and plugs 47 and/or cables maintain the seal. The device thus is effective at all times; it is responsive to high heat sufficient to actuate its heat-sensitive expanding plates 30, 40 which expand on grommet sealing and plugging, and is responsive, in the absence of high heat, to protect against cold smoke originating from fires away from the device and to water coming down onto the device from a sprinkler, fire, hose, broken pipes, etc. on floor above or same floor as the device. The grommet plate 42 (FIG. 1) also serves to protect the cables from sharp edges and provides a seal to the top of the module against entry of water and smoke from a floor above the module floor, as in the case of a fire.

If desired, the thermally activated and expanding plates 30, 40, 41 (FIG. 1) may be enclosed in waterproofing sheathes or envelopes of relatively thin plastic or aluminum other protective material secured thereover in watertight relation, sealing said plates against moisture damage until such time as the plates are thermally activated; at such time the plates expand and readily burst through their protective sheaths or envelopes.

While the present invention has been particularly set forth in terms of specific embodiment thereof, it will be understood, in view of the instant disclosures, that variations may be made by those skilled in the art within the scope of the invention and disclosure, which are thus to be broadly construed within the scope and spirit of the appended claims.

I claim:

1. A device for enabling cables to be pulled therethrough and through a concrete slab floor in which the device is adapted to be mounted, which device is adapted to be positioned in relation to the floor to be formed, prior to pouring the concrete, such that the device is mounted in the floor after setting of the concrete in the floor, and further adapted to prevent heat transmission through the device, such that the fire rating of the floor with the device mounted therein is substantially the fire rating of the floor without the device mounted therein, to enable the device to be fire-rated, and further adapted to prevent passage of cold smoke or water therethrough, comprising:
   (a) an elongated hollow housing, generally tubular shaped, the hollow portion of which is adapted to enable the cables to be pulled therethrough, which includes first and second opposed ends, and first and second opposed end sections;
   (b) means in the first end section of the hollow housing for preventing transmission of heat through the device, such that the fire rating of the floor with the device mounted therein is substantially the fire rating of the floor without the device mounted therein, adapted to enable the cables to be pulled therethrough; and
   (c) means mounted in the second end section of the housing for preventing the passage of cold smoke or water through the device, comprised of resilient material, adapted to enable the cables to pass therethrough, such that, in the absence of heat, upon pulling cables therethrough, the cables are compressed thereby so as to seal the cables in the device.

2. A device as in claim 1, in which the cold smoke or water passage preventing means comprise a grommet plate, comprised of silicone rubber, which includes openable portions through which the cables may pass, adapted to compress the cables in the openable portions upon opening thereof and passage of the cables therethrough, and further adapted to increasingly seal and compress the cables upon increased heat being applied thereto.

3. A device as in claim 1, further adapted to enable power and communication cables to be separately pulled therethrough, in which the first end section of the housing further includes a medial barrier portion, extending axially therethrough for substantially the length thereof, adapted to divide the first end section into separate passages to enable the power and communication cables to be separately pulled therethrough so as to shield and isolate the separate cables, in which the heat transmission preventing means comprise a plurality of members comprised of intumescent material, and in which the medial barrier portion is comprised of an intumescent member, mounted in the first end section of the housing.

4. A device as in claim 1, in which the housing is comprised of a plurality of separate sections, and the device further comprises means mounted between each pair of adjacent housing sections for insulating the sections from the transmission of heat therethrough.

5. A device as in claim 1, in which the the second end section of the housing includes side walls, and each side wall of one pair of opposed side walls is comprised a plurality of elongated channel sections, each channel section being generally C-shaped and including opposed projecting flange portions adapted to radiate heat surges into the concrete slab floor.

6. A device as in claim 1, in which the heat transmission preventing means comprise a plurality of members comprised of intumescent material, and in which each intumescent member is wrapped in a sheath comprised of water-proof material and adapted to prevent water passage therethrough and to permit intumescence of the intumescent members therethrough.

7. A device as in claim 5, further comprising a medial generally Z-shaped member, adapted to extend axially in the second end section of the housing from the medial portion of one channel section to the medial portion of the other opposed channel section, and to interconnect the plurality of elongated channel sections on opposite sides of the second end section of the housing.

* * * * *